July 1, 1947.                    J. J. JONES                    2,423,325
                         RAPID SACK DETACHING DEVICE
                            Filed July 21, 1945
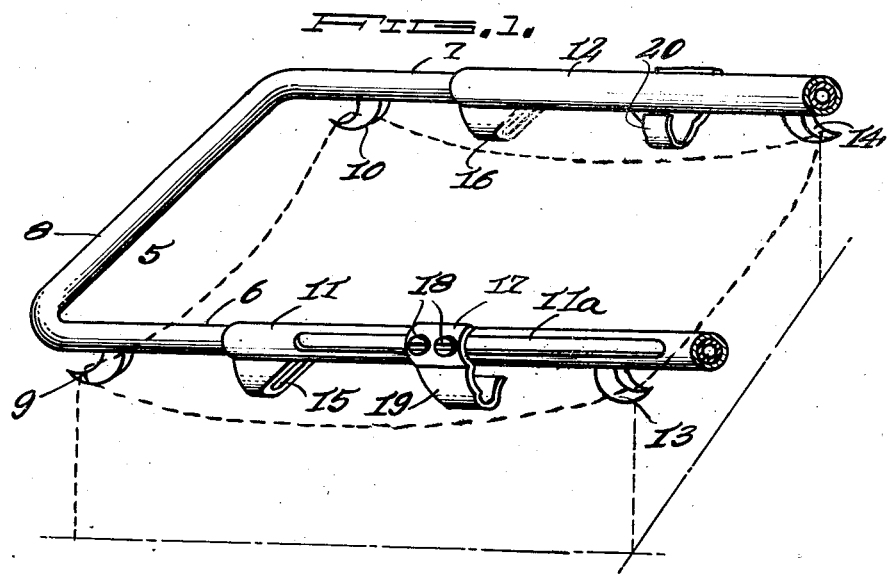
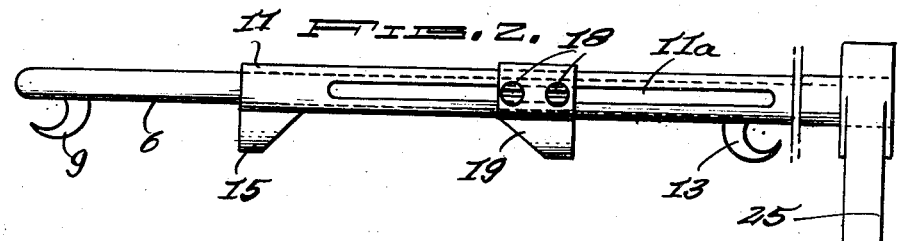
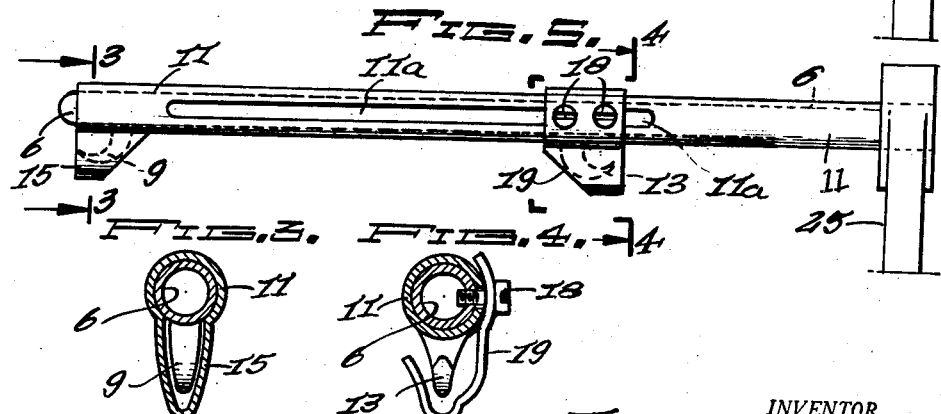
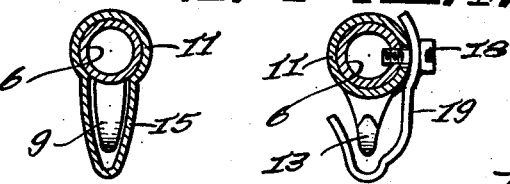
INVENTOR.
JACK J. JONES
BY Carl Miller
ATTORNEY.

Patented July 1, 1947

2,423,325

UNITED STATES PATENT OFFICE 2,423,325

RAPID SACK DETACHING DEVICE

Jack J. Jones, Zillah, Wash.

Application July 21, 1945, Serial No. 606,395

3 Claims. (Cl. 248—100)

This invention relates to an improved sack holding device, and one of its objects is to provide means for rapidly and safely stripping the supporting connections between the upper edge of the sack from the supporting hooks, so that the front hooks and the rear hooks are simultaneously disconnected from the sack, so that the sack and contents may be freely handled.

Another object of the invention is to provide a pair of stationary overhead members with rear hooks, and another member slidable therein and provided with forward hooks, and means cooperating with both members to simultaneously detach the sack from both rear and forward hooks, by a manual sliding operation of one member on the other member.

With the above and other objects in view, the invention comprises certain new and useful constructions, combinations and arrangements of parts, clearly described in the following specification, and fully illustrated in the accompanying drawings, in which:

Fig. 1 is a perspective view, showing the sack stripping means disengaged from the supporting hooks.

Fig. 2 is a side elevation thereof.

Fig. 3 is a cross sectional view, taken on line 3—3 of Fig. 5, looking in the direction of the arrows.

Fig. 4 is a similar view, taken on line 4—4 of Fig. 5, looking in the direction of the arrows.

Fig. 5 is a side elevation, showing the stripping means in sack stripping position over the supporting hooks.

Referring to the accompanying drawings, which illustrate the practical application of the invention, 5 designates a U-shaped member, which includes the horizontal and parallel side bars 6 and 7, and the cross connecting bar 8. The side bar 6 is equipped with a pendant hook 9, which is curved forwardly, and the side bar 7 is equipped with a similar pendant hook 10.

On the side bar 6 a tube 11 is mounted to permit the bar 6 to slide therein. The bar 7 is received by the tube 12 for sliding movement. The tube 11 is equipped with a sack supporting hook 13, which is curved rearwardly, and the tube 12 is equipped with a similar hook 14.

The forward end of the tube 11 is provided with a stripper 15, which is adapted to slide entirely over the hook 9, or to receive the hook 9, when the bar 6 is forced rearwardly in the tube 11. The tube 12 is also provided with a similar stripper 16, which is adapted to receive the hook 10.

The tube 11 is formed with a longitudinal slot 11a, and a sleeve 17 is slidably mounted on the tube 11 and connected by the screws 18 with the bar 6, through the slot 11a. This sleeve 17 is equipped with a stripper 19 which is adapted to receive the rear hook 13. The tube 12 is also slotted longitudinally and a stripper 20 is mounted thereon and secured directly to the side bar 7, in the manner described with reference to the sleeve or loop 17 and the side bar 6. The stripper 20 is adapted to receive the rear hook 14.

A sack to be filled with any material is supported on the two opposed forward hooks 9 and 10 and the two opposed rear hooks 13 and 14, by forcing the upper edge portion of the sack over these hooks. After the sack has been filled, the side bars 6 and 7 are pushed rearwardly in the tubes 11 and 12, by hand pressure on the cross bar 8. This will force the forward hooks 9 and 10 against the forward strippers 15 and 16, and at the same time force the rear strippers 19 and 20 against the rear hooks 13 and 14, thereby detaching all of the upper edge portion of the loaded sack from all of the supporting hooks, both front and rear at the same time.

The tubes 11 and 12 are suitably supported by brackets 25, which may be of any suitable construction, and which permit the side bars 6 and 7 to freely slide in the tubes.

It will be seen, therefore, that my invention provides means for releasing the entire sack and its contents from all supporting hooks, by a single horizontal manual movement.

It is understood that the improved sack holder and stripper may be constructed of any materials useful for this purpose and that various changes in the details of construction, their combination and arrangement, may be made, within the scope of the invention, as defined by the claims hereof.

Having described my invention, I claim as new:

1. A combined sack holder and stripper, comprising a pair of stationary horizontal supports, a pair of supports sliding in the stationary supports, sack supporting hooks carried by the stationary supports, sack supporting hooks carried by the sliding supports, and strippers carried by sliding supports arranged to engage a sack carried by the hooks of the stationary supports.

2. A combined sack holder and stripper, comprising a pair of horizontal supports having sack supporting hooks, and means cooperating with said supports arranged to simultaneously release a sack from all hooks when one of said supports is slidably moved on the other support.

3. A combined sack holder and releasing device, comprising a pair of horizontal supports in the form of tubes disposed in parallel relation to each other and provided with longitudinal slots, a pair of rods sliding in said tubes and connected to each other by a cross bar, a sleeve engaging each tube and having connection with the rod therein through said tube slot, a stripper carried by said sleeve, strippers on the ends of the tubes, sack supporting hooks carried by the rods and sack supporting hooks carried by the tubes, said rods being slidable in the tubes to cause all of said strippers to detach a sack engaging said hooks.

JACK J. JONES.

REFERENCES CITED

The following references are of record in the file of this patent:

UNITED STATES PATENTS

| Number | Name | Date |
|---|---|---|
| 2,235,182 | Weston | Mar. 18, 1941 |